United States Patent
Lefebvre et al.

(10) Patent No.: US 11,858,488 B2
(45) Date of Patent: Jan. 2, 2024

(54) RAIL MONITORING SYSTEM, METHOD AND DEVICES

(71) Applicant: Pennsy Digital Inc., West Chester, PA (US)

(72) Inventors: William Lefebvre, West Chester, PA (US); Wayne H. Murphy, Pottstown, PA (US); Zachary Zasada, Greeley, CO (US); Zachary Ryan Brook, Leola, PA (US)

(73) Assignee: Pennsy Digital Inc., West Chester, PA (US)

( * ) Notice: Subject to any disclaimer, the term of this patent is extended or adjusted under 35 U.S.C. 154(b) by 0 days.

(21) Appl. No.: 17/191,602

(22) Filed: Mar. 3, 2021

(65) Prior Publication Data

US 2021/0278309 A1    Sep. 9, 2021

Related U.S. Application Data

(60) Provisional application No. 63/012,829, filed on Apr. 20, 2020, provisional application No. 62/984,748, filed on Mar. 3, 2020.

(51) Int. Cl.
*B60T 17/22* (2006.01)
*F16M 13/02* (2006.01)
(Continued)

(52) U.S. Cl.
CPC .......... *B60T 17/228* (2013.01); *B60T 17/221* (2013.01); *F16D 66/028* (2013.01); *F16M 13/02* (2013.01);
(Continued)

(58) Field of Classification Search
CPC .... F16D 66/028; F16M 13/02; G01M 5/0025; G01M 5/0058; G01S 13/08; G01S 13/88
See application file for complete search history.

(56) References Cited

U.S. PATENT DOCUMENTS 4,518,855 A * 5/1985 Malak .................. G01B 11/272
250/203.1
9,689,760 B2 * 6/2017 Lanza di Scalea . G01M 5/0025
(Continued)

FOREIGN PATENT DOCUMENTS

| CN | 112304232 A * | 2/2021 | .............. B25J 11/00 |
| DE | 102015209721 B3 * | 10/2016 | ................ B61L 1/16 |
| EP | 3275764 A1 * | 1/2018 | ............ B61L 23/041 |

OTHER PUBLICATIONS

Translation_CN_112304232_A_I.pdf, machine translation of CN-112304232-A (Year: 2021).*
(Continued)

*Primary Examiner* — Bernarr E Gregory
*Assistant Examiner* — Kenneth W Good
(74) *Attorney, Agent, or Firm* — Bonini IP Law, LLC; Frank J. Bonini, Jr.

(57) ABSTRACT

Methods, systems and devices for monitoring the stress of a rail, in particular, of continuous welded rail (CWR), providing a device that includes radar processing mechanisms and circuitry which is mountable on a rail to be monitored. The radar unit is sealed in a housing and projects a beam to a fixed target that is within a detection range of the radar unit. The radar unit also includes circuitry that allows programming of readings to take place at predetermined time intervals so changes and the extent of changes in conditions of the rail may be determined, and communicated to a remotely situated monitoring device, which may take place through a gateway or other communication network. The devices also may be used to measure temperature and other properties, rail conditions within a tunnel, such as proximity of the rail to walls, as well as ground condition, and bridge monitoring.

32 Claims, 12 Drawing Sheets

(51) Int. Cl.
*G01S 13/88* (2006.01)
*F16D 66/02* (2006.01)
*G01M 5/00* (2006.01)
*G01S 13/08* (2006.01)
*F16D 66/00* (2006.01)

(52) U.S. Cl.
CPC .......... *G01M 5/0025* (2013.01); *G01S 13/08* (2013.01); *G01S 13/88* (2013.01); *F16D 2066/006* (2013.01)

(56) References Cited

U.S. PATENT DOCUMENTS

| | | | | |
|---|---|---|---|---|
| 10,518,791 | B2* | 12/2019 | Singh | G06F 18/251 |
| 10,543,861 | B1* | 1/2020 | Bartek | G01M 5/0058 |
| 10,641,898 | B1* | 5/2020 | Moreu Alonso | G01S 17/50 |
| 10,894,551 | B2* | 1/2021 | Bartek | B61L 23/047 |
| 2003/0048193 | A1* | 3/2003 | Puckette, IV | G01S 7/41 |
| | | | | 342/61 |
| 2007/0044566 | A1* | 3/2007 | Harrison | B61L 23/047 |
| | | | | 73/760 |
| 2016/0305459 | A1* | 10/2016 | Park | F24S 25/61 |
| 2019/0135317 | A1* | 5/2019 | Hilleary | G01S 13/931 |
| 2019/0232988 | A1* | 8/2019 | Lang | G01H 1/00 |
| 2019/0367061 | A1* | 12/2019 | Mesher | B61L 23/00 |
| 2019/0391049 | A1* | 12/2019 | Jones | B61L 15/0081 |
| 2020/0309643 | A1* | 10/2020 | Curtis | G01S 17/08 |
| 2022/0170215 | A1* | 6/2022 | Oldewurtel | E01B 29/32 |

OTHER PUBLICATIONS

Translation_EP_3275764_A1_I.pdf, machine translation of EP-3275764-A1 (Year: 2018).*
Translation_DE_102015209721_B3_I.pdf, machine translation of DE-102015209721-B3 (Year: 2016).*

* cited by examiner

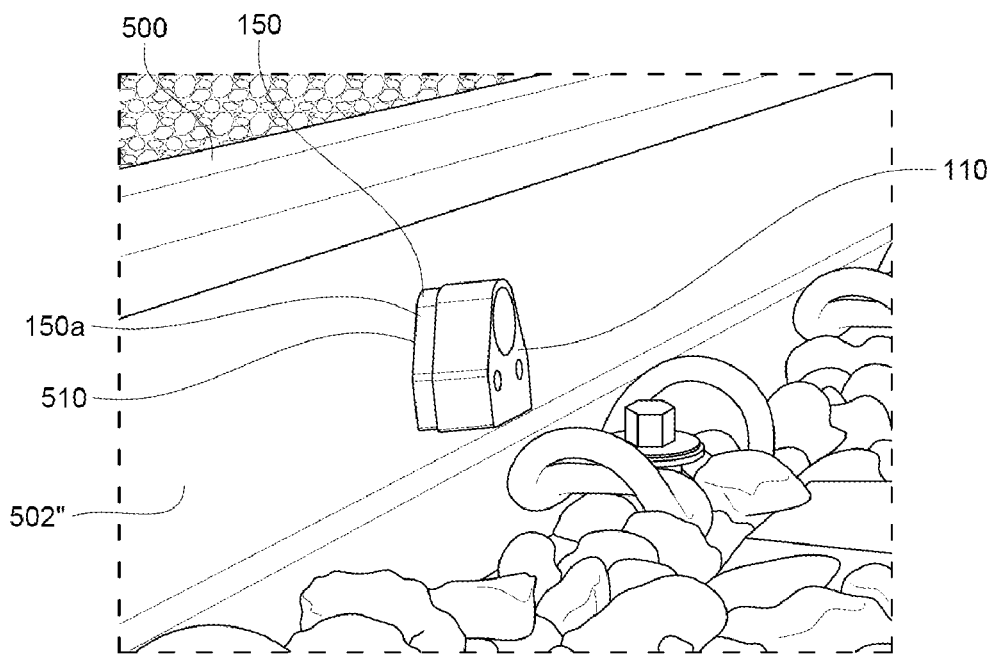
FIG. 12
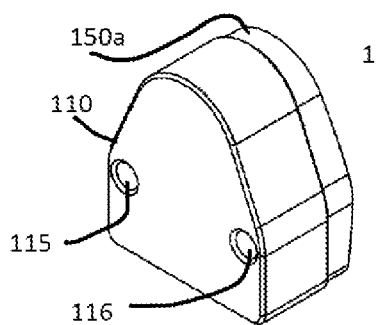
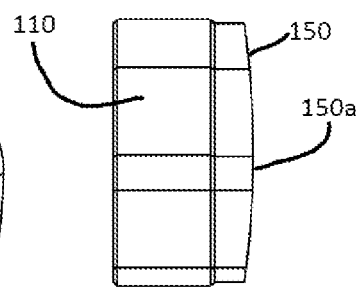
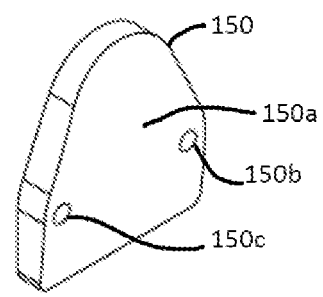
Fig. 13  Fig. 14  Fig. 15
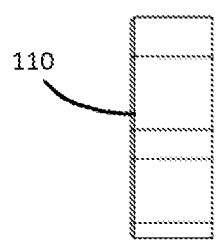
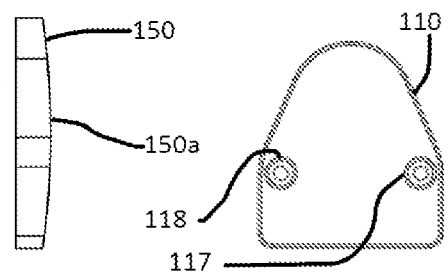
Fig. 16  Fig. 17

RAIL MONITORING SYSTEM, METHOD AND DEVICES

CROSS-REFERENCE TO RELATED APPLICATIONS

The benefits under 35 U.S.C. §§ 119(e) and 120 of the following are hereby claimed: U.S. Provisional Application Ser. No. 62/984,748, filed on Mar. 3, 2020, and U.S. Provisional Application Ser. No. 63/012,829, filed on Apr. 20, 2020, the complete contents of which are incorporated herein by reference.

1. FIELD OF THE INVENTION

The invention relates to the field of rail construction and monitoring, and in particular a system and devices for monitoring movements and stresses in rails.

2. BRIEF DESCRIPTION OF THE RELATED ART

Rails that support railway vehicles, engines and trains are subject to movement and shifting from time to time. Most modern rail construction uses continuous welded rail (CWR). These continuous welded rails become long continuous members that are fixed at both ends. As a result of the rail having very few joints, the rail experiences large longitudinal loads caused by restrained thermal expansion and contraction, following daily or seasonal temperature variations.

The neutral temperature in continuous welded rail (CWR) is the rail temperature at which the net thermally induced forces (also referred to as stress) in the rail are zero. The rail neutral temperature (RNT) also may be associated with rail "laying" or "anchoring" temperature. Rail neutral temperature (RNT) must be controlled during rail laying and track maintenance to minimize compressive forces in summer that can lead to track buckles or sun kinks, and tensile forces in winter that can pull the rail apart at welds or flaws. Increases or decreases from the rail neutral temperature (RNT) may be caused by variations in the ambient temperature in the environment in which the rail sits. These temperature variations may cause the metal of the rail to expand and cause the rails to buckle, or contract, and may even cause the rails to fracture. In cases where these conditions occur, an extreme effect may be train derailment.

The RNT typically is the temperature when the rail is installed (e.g., laid down, anchored and welded). Where a rail is not subject to stresses, and is in a destressed condition, difficulties exist in determining the RNT, and there may be as much as a +/−10° F. error in the measurement. There are two types of main forces that can affect the rail, namely compressive forces and tensile forces. Compressive forces develop in the rail when the temperature increases above the rail neutral temperature, whereas, tensile forces develop when the rail temperature falls below the neutral temperature. When the compressive forces are high enough, unstable conditions develop in the rail which may cause buckling of the rail, or track shift. Conversely, if the rail temperature is too low, the tensile forces may result in a break of the rail or could pull apart the rail. The RNT may also be effected by maintenance activities, train operation and environmental conditions.

In order to alleviate stress conditions due to temperature extremes or changes, attempts have been made to install CWR at a median ambient temperature, but this still does not prevent rail buckling or fracturing when exposed to future fluctuating temperature conditions.

Attempts have been made to try to determine whether a rail has been subjected to a stress sufficient to require replacement of the rail. In some instances, a traditional test of RNT involves removal of a section of the rail by cutting the section from the rail for testing. This traditional approach involves measuring the gap, performing calculations and then re-welding the rail. Of course, another drawback with this method is that the track of which the rail is a part remains inoperative when the testing is conducted. Some methods have involved using a physical measure or a string pot, while other methods have involved use of a strain gauge or potentiometer. Again, with most of these types of methods, the rail activity must be shut down while the measurements take place. The prior measurements typically involve interruptions in rail service, as individuals must make the measurements over multiple areas of the rail, which can take time to do. Also, where a rail is located in a remote area, individuals must travel to the rail situs, accessing it by automotive vehicle, air transport (helicopter, etc.), or even a rail vehicle on the rail itself or an adjacent rail.

A method and system is needed to promote safe rail operations by determining the condition of CWR.

SUMMARY OF THE INVENTION

A method, system and devices are provided for monitoring the stress of a rail, in particular, of continuous welded rail (CWR). The method involves providing a device and programming a device to monitor the rail condition, and according to preferred embodiments, the system, method and devices monitor movement of a rail along curves. Preferred embodiments of the devices comprise a radar unit, which according to preferred embodiments is mounted on the rail to be monitored. The radar unit is sealed in a housing and projects a beam to a fixed target that is within a detection range of the radar unit. According to alternate implementations, the radar unit may be installed proximate to the rail such as on the stake or other fixed object, and project a beam at the rail to monitor the distance between the fixed point of installation of the monitor unit and the rail. The radar unit also includes circuitry that allows programming of readings to take place at predetermined time intervals so changes and the extent of changes in conditions of the rail may be determined. The radar unit also includes wireless communication capabilities with circuitry or modules to transmit via a low power wireless signal to a remote device, such as for example, a cellular modem, base station, smartphone or other device.

Rail vehicles traveling on a rail make a contact with only a portion of the rail and wheel. The wheels of a railway vehicle typically may have a semi-conical taper. The semi-conical shape facilitates steering of the wheelset around curves, so that the wheel flanges do not come in contact with the rail sides. According to some typical arrangements, the rails are constructed to slant inwards, which may be a slant having the same rate as the wheel conicity. The contact portion, also known as a contact patch, is where the wheel touches the rail, as the entire surface of the wheel does not contact the rail. In many cases the contact patch may be only 10 mm (or less). The geometry of the rail and any changes based on the rail movement as it heats up and cools down may diminish the area or size of the contact patch. Therefore, it is critical that any movements of the rail be monitored to ensure that the rail has not moved to an extent that the contact patch, which is small to begin with, would be minimized to no longer adequately support the railway vehicle traveling thereon. The system obtains periodic real-time conditions of the rail, and in particular is useful for monitoring curved rail sections. The monitoring units preferably are attached to the rail at spaced apart locations on the rail. Each radar unit sends a signal with the information and track location or location code or identifier to a remote device. The track condition is determined from the signals, and also may alert of a sudden discrepancy or condition (such as a fracture) or may demonstrate a gradual change over time. Events may trigger a response which may be provided to an operator via a screen or text (or other means), and in cases where a severe condition is determined, the system may provide an alert to the train car operator. According to some embodiments, the train may be configured to receive a communication or signal when a hazardous condition is detected that creates an unsafe condition. For example, where a rail has fractured, and would be likely to cause a derailment, the system may send a stop signal to the train (e.g., engine) before it travels over the defective rail. The system therefore has the potential to prevent derailments. According to embodiments, the system may communicate with remote devices that in turn are linked with a network that may communicate with the train operator or train operating system. Also provided is a method, system and devices for monitoring manual track rail switches. Certain switches are mechanical switches which have a system to flag where the switch is open. Switch position is a critical safety issue during train operation, and may lead to a broken switch or even derailment if the switching operation is not correctly performed. Manual switches do not report their status to operations or documenting switching events, and misinterpretation of switch position and its consequences may exist in the field. For the mechanical type switches, a flag is used to show whether the switch is open. The present system may implement monitoring using the radar unit mounted on the switch or to detect within the unit's detection range the switch position. The radar unit may then be coupled with a remote device or unit, or proximal unit that is programmed to react to the signal provided by the radar unit to flag when the switch is open. The switch signal may be issued locally to a local device, or alternatively, may be partially integrated with the train traveling on the rails where the switch is located. For example, according to some embodiments, a general communication signal may be issued and communicated to the train or railway's positive train control system (PTC). The train or railway vehicle therefore may be provided with the information of the switch position. The train therefore may be able to prevent further travel where a switch is not in the proper position, or confirm a proper position of the switch and confirm travel may proceed.

Alternative implementations of the method and alternate embodiments of the devices and methods also may be used in conjunction with monitoring of other structures, such as bridges, which from time to time may be hit by a truck, or may be subject to certain earth movements, each of which having the potential to impact or affect the condition of the structure.

The system and devices are useful in monitoring RNT changes in railway track that is in service, while the track is in service and railway vehicles are traveling over it. The movement of a curved rail or rail section is monitored and may be identified when a hazardous condition or condition requiring service is present. Monitoring with the system and devices may take place while traffic is on the rail being monitored, as well as when rail traffic is not present.

BRIEF DESCRIPTION OF THE DRAWING FIGURES

FIG. 12 is a perspective view of a rail section showing a wireless monitoring sensor mounted on the outer side of a rail with a mounting plate.

FIG. 13 is a perspective view the wireless monitoring sensor device as viewed from the front, with the mounting plate installed on the rear thereof.

FIG. 14 is a right side elevation of the monitoring device and plate shown in FIG. 13.

FIG. 15 is a perspective view of the mounting plate of FIG. 13 as viewed from the right and looking at the rear, shown separately from the monitoring device.

FIG. 16 is an assembly view showing the monitoring device and mounting plate of FIG. 13.

FIG. 17 is a rear elevation view of a monitoring device showing rear mounting bores.

DETAILED DESCRIPTION OF THE PREFERRED EMBODIMENTS

Figure 1:
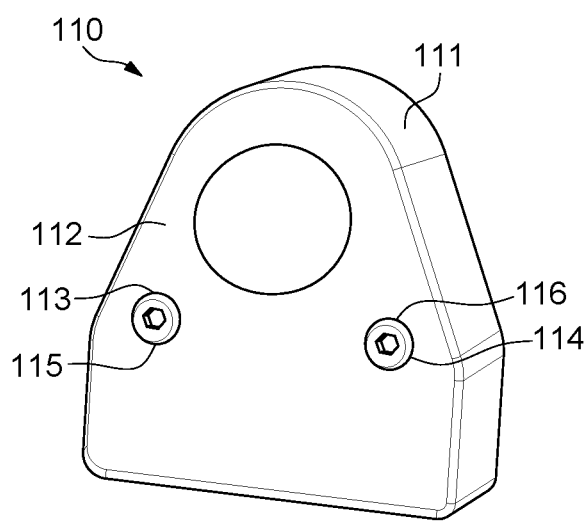
FIG. 1 is an image of a perspective view of an exemplary embodiment of a railway rail curve wireless monitoring sensor device according to the invention.
Figure 2:
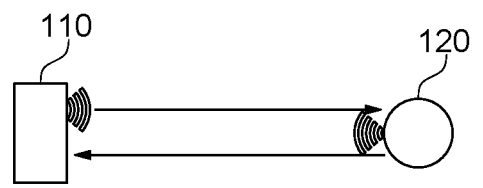
FIG. 2 is a schematic depiction of the wireless monitoring sensor device of FIG. 1 showing a target and RF waves.
Figure 3:
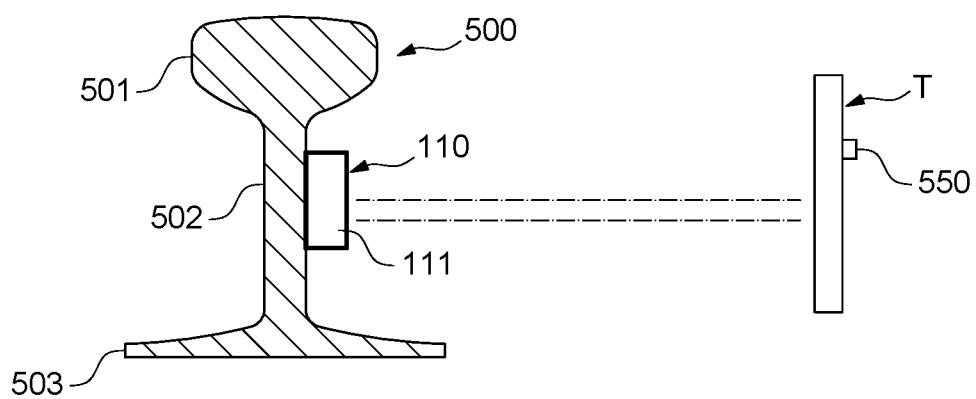
FIG. 3 is a sectional view of an exemplary depiction of a rail, showing the railway rail curve wireless monitoring sensor device of FIG. 1, installed on a rail, and illustrating RF waves that the sensor broadcasts and echoes receives off of the Target.

As illustrated in FIG. 1, a rail monitoring device 110 is shown according to an exemplary comprising a wireless sensor 111. The sensor 111 is configured as a unit having a housing 112 for housing components therein and protecting the interior space and components from dirt, debris, and water and moisture intrusion. According to some embodiments the device 110 is configured with a mounting means for mounting the device 110 a rail preferably at a location of the rail that is to be monitored. The rail monitoring device 110 is mounted on a rail that is operative as part of a track on which railway vehicles travel. Sensors 111 may be arranged in spaced apart locations to measure locations along a rail. Preferably rail curves are measured with the devices 110. A suitable mounting mechanism may be used to mount the device 110 to the rail. Welding, adhesives (e.g., including tapes), and/or magnetic means, such as magnets may be used to secure the device 110 to a rail. For example, the mounting means preferably are releasable to allow for the sensor to be removed and replaced, such as, for example, removable adhesive tape, or magnetic mounting, or other mounting means. The device preferably is mounted to the rail. As illustrated in FIG. 3, a rail section 500 is shown, comprising an exemplary embodiment of a typical rail profile, having a head 501, a web 502 and a foot 503. The device 110 is shown having mounting means, which according to an exemplary embodiment depicted, comprises a pair of bolts 113, 114, which are shown extending through apertures 115, 116 provided in the device housing 112. The apertures 115, 116 may be configured with counterbores to respectively receive the heads of the bolts 113, 114. The housing 112 preferably seals around each aperture 115, 116 to seal out water, dirt and debris. Matingly threaded bores may be provided on the rail 500, or mount to which the rail monitoring device 110 may be mounted. The device 110 is shown in an exemplary depiction in FIG. 3 mounted to the rail 500 by affixing it to the face of the rail web 502. The device 110 may be adhesively or magnetically mounted to the rail web 502 (as an alternative to boring into the rail structure).

Figure 9:
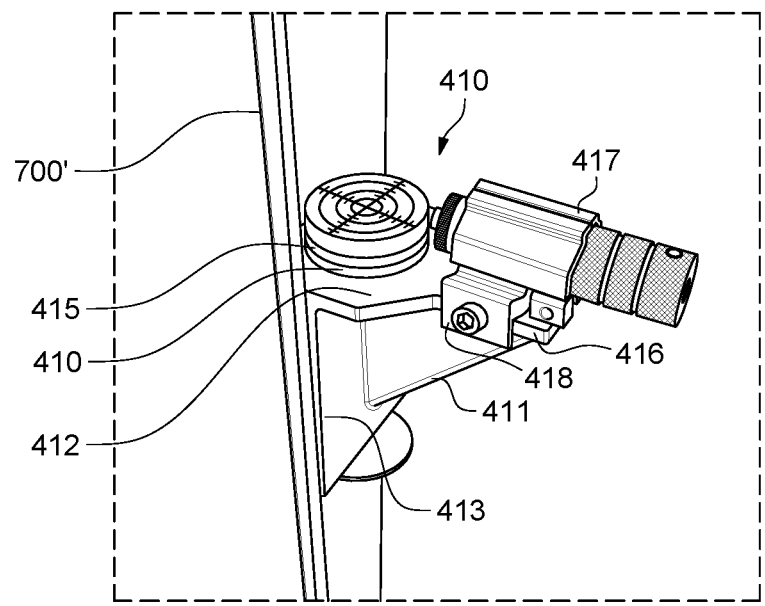
FIG. 9 is a perspective view of an embodiment of a reference stake alignment tool, shown from the top left looking down.

The device 110 in FIG. 3 is shown with an exemplary representation of a target T, which may comprise any suitable target, including a target installed in a stationary position proximate to the rail being monitored and within the sensor's detection range and in a line that the sensor radar signal is directed or focused to reach. The relative movement of the rail 500 with regard to the target T may be monitored and stored, and/or used in real-time, to obtain the condition of the rail section. Monitoring also may be done to provide a base value for the rail when it is first installed, or for a rail section already in use that is to be monitored. Referring to FIG. 3, an object T may comprise a metal stake affixed to the ground. The target T, such as the stake, also may have a movement sensor on it to determine whether any disruption of movement of the target T has taken place. The movement sensor 550 associated with the target T may be a suitable sensor such as a GPS, accelerometer, gyroscope, and may be provided on or in the form of an integrated circuit or microcircuit, or chip. The target motion therefore may be coordinated to provide a signal response that can be coordinated with the responses of the rail monitoring device 110 so that aberrations in the detection may be recognized and potentially excluded from the measurements of the rail movement. Alternatively, according to some configurations, the target monitor also may have communications equipment, such as a chip or low power signal transceiver, and may transmit the status of the Target (such as whether the Target has been dislodged, whether the Target is in a proper position, e.g., unmoved, and/or whether the Target has been compromised, e.g., removed, run over, ran into by an object or animal). As illustrated in FIG. 9 and discussed herein, the signal strength may be used to detect and provide information about the rail being monitored. The Target status signal from the monitor 550 may be transmitted to a nearby or proximate device that is within the signal range of the target monitor 550. Alternatively, the device to which the target monitor transmits a signal may be the same device that the rail monitoring device 110 transmits its signal. According to alternate embodiments, the rail monitoring unit 110 may be provided with a transceiver to receive the signal from the target monitor, and may be programmed to transmit that signal with rail monitoring data obtained from the radar signals of the monitoring unit 110.

The device 110 includes at least one power supply for powering the device components that are responsible for emitting signals and detecting the signals and reflections off of the target, such as the exemplary Target T (FIG. 3) or other target. According to preferred embodiments, the wireless rail monitoring device 110 comprises a radar unit with radar processing components and/or circuitry therein. According to preferred embodiments the device 110 utilizes a battery as a power source, which is housed within the device housing 112. The battery preferably is a low self-discharge, long-life battery. One example of a suitable battery is a lithium thionyl chloride type battery.

Figure 4:
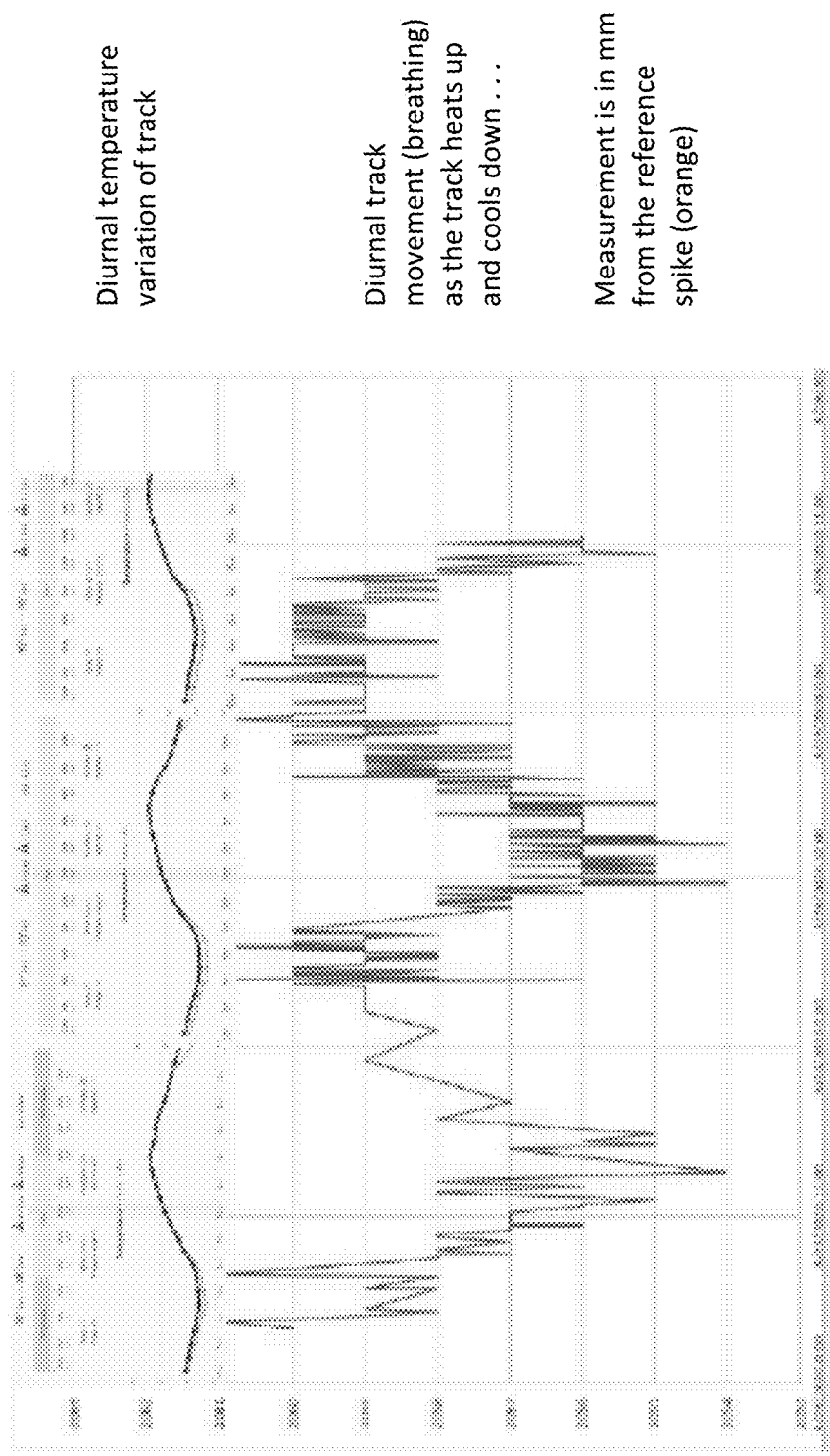
FIG. 4 is a graph showing the monitoring of movement of a rail as represented by data obtained using the wireless monitoring sensor device.

The device 110 includes suitable circuitry for generating and monitoring a rail condition via generating radar signals and directing those signals at an appropriate target to determine the rail condition by detecting movement of the rail being monitored. For example, referring to FIG. 4, a graph is shown representing an example of potential sensor data obtained from a monitoring device 110, which includes the diurnal temperature of the rail (e.g., Rail 500) in the upper graph, and the diurnal track movement in the lower graph. The diurnal track movement shown in the lower graph represents the monitoring device 110 signal monitoring of the distance in mm from the reference point, such as the target T (see 550 in FIG. 3). The diurnal track movement is the measure of the track breathing (movement) as the track heats up and cools down. As discussed herein, the graph may be adjusted to determine whether the target has moved or been disrupted. The scale at the bottom of the graph is a timeline so rail movement (on the y-axis) is plotted against time (on the x-axis) where time is shown measured in days and times during a day. Other time references may be programmed for monitoring, and movements may be monitored every minute, number of seconds, every five minutes or other time value.

The radar signal preferably is tuned (in power, as well as frequency, modulation or other parameter) to cover a distance within which monitoring is desired to take place. According to some implementations, the radar signal is directed at a target, which may be a surface or structure proximate to the rail location where the sensor 110 is installed and located within the detection range of the sensor 110.

According to preferred embodiments, the device 110 includes circuitry powered by the power supply, such as the battery. The circuitry includes a radar signal generator, and processing components for processing the radar signals, and communications components for communicating the information to a remote component, and according to some embodiments, to receive communications from a remote component. Examples of the device circuitry may include a radar signal generator or transmitter and receiver, transceiver and one or more antennas. The device components may be in an integrated circuit or chip that includes the components needed to process and emit the radar beam and to detect the reflected beam, as well as handle other operations of the radar processing or adjustment. The components may include a radar signal generator and antennas as well as software or other instructions for processing the signals and communicating them to a remote component. For example, a microcontroller or microprocessor may be provided as part of the circuitry. Software including embedded logic, as well as microprocessors, microcontrollers, microcircuits, containing instructions for instructing a microprocessor or processor to process, store and/or communicate the radar signals, may be employed to comprise the circuitry within the unit 110.

According to some preferred embodiments the radar unit is provided in the form of an integrated circuit that is prepared for the conditions and distances that are typical for targets, and/or which may be adjusted for target locations, for an installation on a rail.

The device 110 also includes a communication component, such as for example, a low energy wireless signal transmitter/transceiver, which preferably allows for at least the signal from the wireless sensor device 110 to be transmitted and received by a remote device (e.g., smart phone, tablet, computer, yard gateway), and preferably allows for two way communications between the sensor 110 and a remote device. A suitable communications component includes a low power signal transmission mechanism (examples of which include Bluetooth® or compatible modules). The rail monitoring sensor devices may be equipped with a low power wide area networking (LPWAN) capability such as cellular-based solution (LTE Cat-M1 or NB-IOT for instance) or a public or private LPWAN technology such as LoRaWAN or Sigfox. Other suitable communications components and/or protocols may be used, and preferably ones that may operate using low power may be used.

Figure 5:
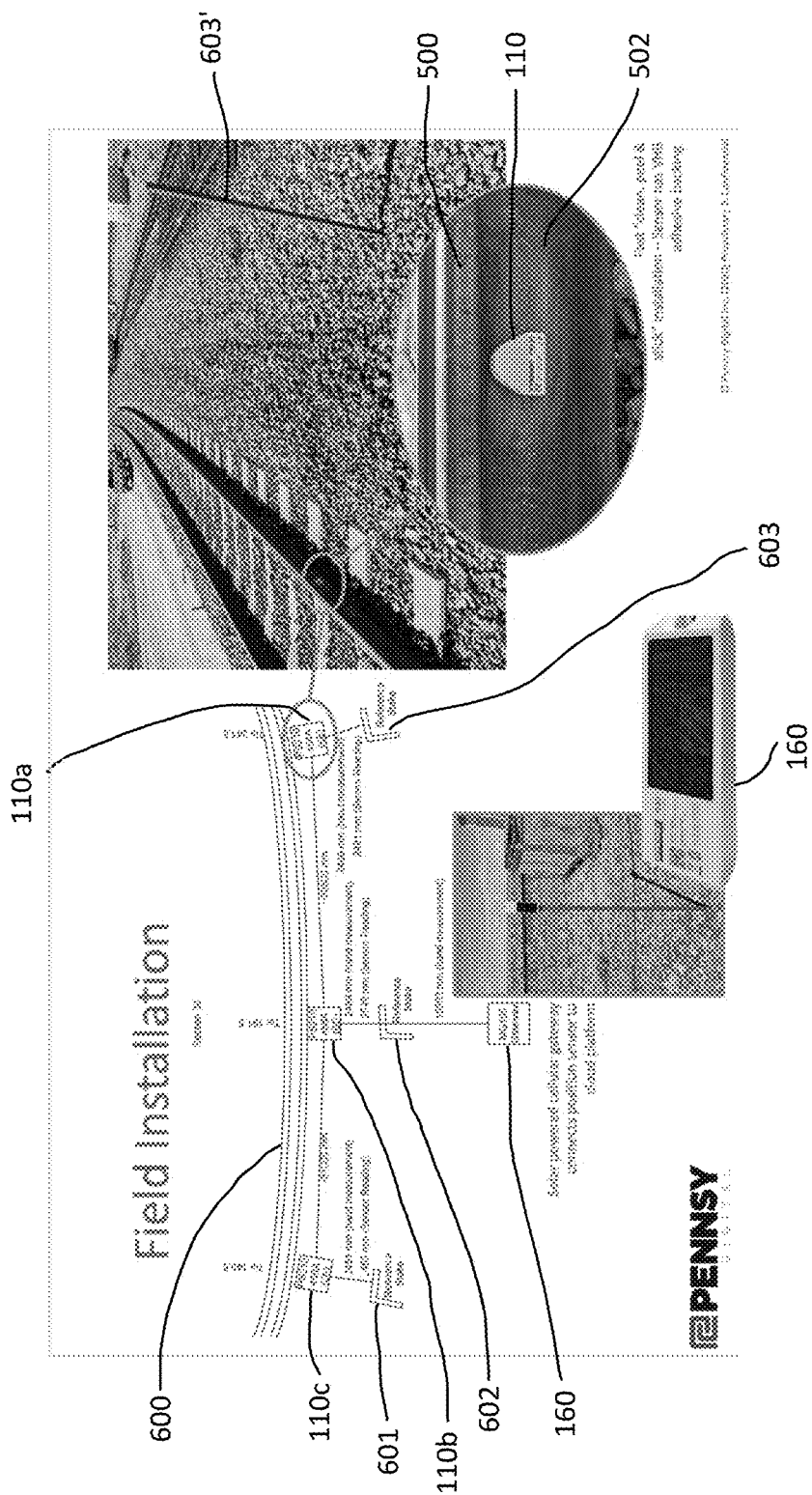
FIG. 5 is a perspective view of a rail, depiction of a rail shown in FIG. 3, also illustrating an implementation of the system in a schematic diagram for a field installation with a plurality of wireless monitoring sensor devices installed along a rail.

Referring to FIG. 5, an exemplary implementation of the wireless sensor monitoring system is shown with a section of a rail 600 on which three wireless sensors 110*a*, 110*b*, 110*c* are schematically represented. According to a field installation, the sensors 110 (such as those depicted 110*a*, 110*b*, 110*c*) are mounted to the track rail in a suitable location to direct a radar beam to a target. Although the sensors are shown mounted to the web of the rail, the sensors may be installed on an alternate location on the rail, suitable for detecting the rail movement or "breathing". In the exemplary embodiment, the spacing of the wireless monitoring sensors is about 30000 to about 31000 mm. The number of wireless monitoring sensors deployed on a rail may be any number suitable for the conditions and parameters being monitored. For example, closer sensor placement may be done where an anticipated problem area is known or expected, or where higher speeds are typical.

The wireless rail monitoring sensors 110*a*, 110*b*, 110*c* are shown in an arrangement with a gateway shown comprising a gateway device 160 situated in proximity to the monitoring sensors 110*a*, 110*b*, 110*c* to be within a signal distance so as to receive and/or communicate wireless communication signals from the sensors 110*a*, 110*b*, 110*c* that indicate the rail position. This is done through an identification of the sensor 110*a*, 110*b*, 110*c* which may be a unique serial number or identifier assigned to the sensor. The signals preferably are communicated at predetermined time intervals from the wireless monitoring sensors 110*a*, 110*b*, 110*c* to the gateway in order to preserve battery life. Communication of the monitoring signals may take place at a suitable predetermined time interval. Alternatively, if desired, the sensors 110 may be configured to monitor upon the detection of a predetermined condition, such as, for example, vibration (from a passing rail vehicle), as well as the predetermined time interval. According to some embodiments, the gateway may be solar powered with a rechargeable energy cell circuit or battery, or may contain a long-life battery. The gateway device 160 alternatively may be hardwired where a location permits such a connection. The gateway device 160 preferably is communicatively linked through a communications system, such as cellular, Wi-Fi, short range or other type of communications mechanism or network, to a server or other computer where the information relating to the rail movement as reported via the radar unit monitoring signals, may be processed and used to provide reports and information as to the track condition. Embodiments also may include a mechanism for integrating the train controls and communications system, including an onboard system that may alert or reduce the speed of the train upon sensing a hazardous condition. The system therefore may be implemented to prevent derailments that might otherwise occur from a rail that is out of its proper condition or operational tolerance.

Figure 6:
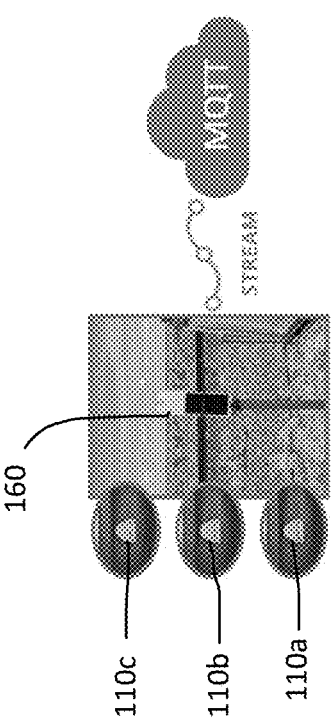
FIG. 6 is a communication device arrangement shown with a plurality of wireless monitoring sensor devices that may report through the communication device.

As illustrated in FIG. 6, the gateway 160 is illustrated as a cellular gateway. In the exemplary arrangement of FIG. 6, the gateway 160 is shown sending sensor messages it receives from the sensor unit 110 to a Message Queuing Telemetry Transport (MQTT) broker via a data streaming network. According to this embodiment, the MQTT network publishes the information permits subscribers of the information to receive the information through the MQTT distribution. In the embodiment depicted, an operating entity may operate the system to ensure uniformity and track conditions and progress. The system may be used by a client or customer to receive status conditions communicated from the sensing monitors 110. In the embodiment illustrated, the client or customer connects its Internet of things (IoT) platform to the MQTT broker. The operator or provider may process and package the signals for distribution, and may provide the signal information, in terms of a raw measurement, and/or an interpretation of the signal translated to a condition (such as immediate danger condition where the track should not be used, or a condition not imminently dangerous but can be scheduled for visual or other inspection).

According to some embodiments, the IoT platform may include cleanse and filter data stream functions; transform and enrich data stream functions, Time-Series data store (processed and raw data), analytics and machine learning, and visualization. For example, the data and other information, including raw data and/or processed data may be used for visualization presentations to illustrate in a graphic, such as a static graphic or motion graphic) to demonstrate or represent a condition or conditions of the rail or track. The representation may be correlated with a time value or over a time interval.

The monitoring units 110 when deployed on a rail may monitor and provide information, which preferably includes the position of the rail being monitored as well as the temperature. The signal information preferably is processed and may be presented in a number of formats. For example, results may be presented in a plot of distance in mm against time (time stamp–minute). A zeroed or baseline reading of the distance is taken when the position monitoring unit 110 is installed on the rail. The distance, for example, is the distance from the unit to the target such as the stake T. As shown in FIG. 5, an initial measurement is taken, which indicates the position of the monitor 110c from the stake 601, which in the exemplary depiction is represented as 2451 mm for a hand measurement of the distance, and 2463 mm for the monitoring unit 110c measurement. The stake 601 serves as the Target for the monitoring unit 110c in the depiction in FIG. 5, while the stakes 602 and 603, serve as targets for the respective monitoring units 110b, 110a. Although the stakes are illustrated, the target may comprise any suitable target that may be fixed as a reference for the radar unit of the position monitoring sensor to reflect a beam off of. Data obtained by monitoring using the sensor units 110 (e.g., 110a, 110b, 110c) may be processed for errant or data outside of the measurement range. For example, in instances where the sensor to target path is obstructed, or the signal is disrupted, an errant value that does not represent the distance being monitored may be obtained and reported. For example where a value is produced that is clearly impossible for the rail to be intact for the subsequent measurements provided, that errant value may be removed with data cleansing. Another example is where the data value is absent or shows missing data. The missing data may be the result of one sensor that appears to have been blocked from reaching a gateway for some period. Radio communication related as data occasionally reaches gateway. Therefore, this data may be processed to be excluded from the information in one or more ways, including complete removal, averaging any data points obtained int eh time interval, and coordinating any averaging with any temperature readings or changes (or other monitored events, such as rain, snow, etc.)

The data may be presented in one or more graphical depictions representing the monitoring information. A graph may be evaluated through manual human inspection or through programs that process the information and look for deviations (based on thresholds, distance/time movements, or other parameter). For example, a physical event (i.e., anomaly) may be identified and a graph or other report may show data measured by two different sensors. The graphed data for example, may identify conditions such as sudden track movement (e.g., around 5 mm or more). For example, where the condition presents itself more than one time, then the data could be determined to be event related, and possibly is an indication of being vehicle related, or some other condition. The sensor information also may identify typical conditions, including information showing variation of the monitored distance, as a result of track "breathing" during the day as the temperature changes. The monitoring sensor, gateway or other unit may be configured to access weather station data, or the weather station data may be obtained subsequently or at the time the date is processed. According to some embodiments, the data subscriptions provide data that is processed along with weather station data. For example, one or more locations may exhibit track "breathing" to be more pronounced than one or more other locations.

The monitoring unit 110 may provide measurements using the signal strength to determine whether something has happened with the reference stake (and hence reliability if the measurement data derived). The information obtained from the monitoring unit 110 may include signal strength. The distance measurement may be graphed against time, and the signal strength also may be graphed against time. This information enables monitoring for whether there is an issue (an anomaly), which may be observed by the sudden large change in the strength of a reflected signal. For example, the cause may be due the movement of the reference stake, or an object blocking the signal between the sensor and the reference target. The signal strength may provide a metric for the measurement quality. This change may be detected and may identify an issue and indicate that the signal is no longer reliable.

Figure 7:
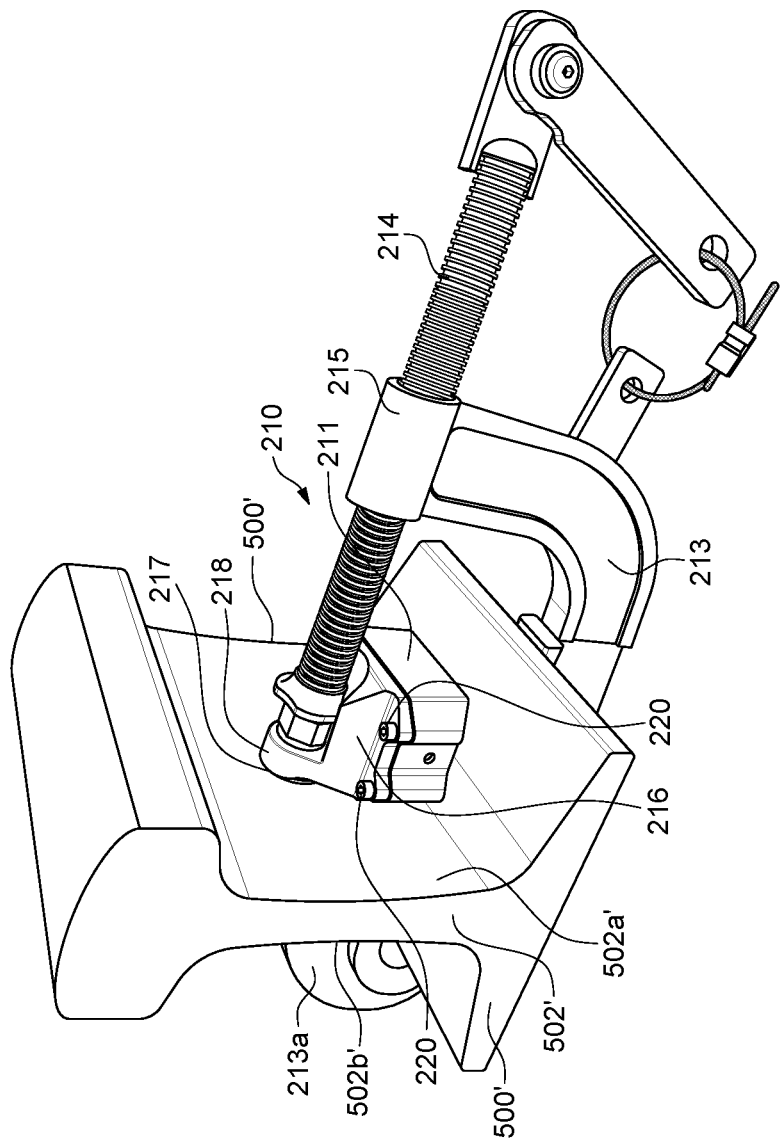
FIG. 7 shows perspective view of an alternate sensor for asset monitoring which is configured to measure health parameters, such as temperature of a surface, acoustics and vibrations, acceleration and other properties.

Referring to FIG. 7, an alternate embodiment of a monitoring device 210 for monitoring an asset and parameters such as the surface temperature of the rail (or other asset to which the device is attached) and also may include an accelerometer, as well as sensors for measuring and monitoring acoustics, vibration and other machine health properties. The device 210 includes a sensor unit 211 and a clamp 212 having a clamp body 213 with a threaded shaft 214. The threaded shaft 214 passes through a matingly threaded collar 215. The clamp 210 provides for a temporary installation onto a rail. The clamp body 213 is shown beneath the rail 500' and turning toward the opposite side 502a' of the rail web 502'. The body portion 213 preferably has an end 213a' that rests on the rail and is clamped against the rail web 502b'. The device includes a clamp end 216 having a contact point 217, and being configured to connect with the sensor unit 211. The sensor unit 211 is shown secured to the end seat 216 with screws 220 (there being screws on the opposite side of the unit 211 and end seat 216 (not shown). As depicted, according to a preferred embodiment, the contact point 217 comprises a projection that is shown projecting from the body 218 of the clamp end seat 216. The monitoring device 210 may be installed by fitting the clamp end 213a' against the rail web (such as for example, the rail web 502') and then rotating the screw shaft 214 to force the contact point 217 of the clamping end 216 into engagement against the face of the web 502a'. Preferably, the device 210 is mounted with the sensor being level relative to the direction in which movement is measured (e.g., longitudinal). The sensor unit 211 of the device 210 preferably is configured comprising circuitry to monitor the asset, and preferably may include temperature, acoustical, vibration and movement, and other health parameters of the asset, such as the rail to which the sensor is associated or is mounted. The sensor unit 211 preferably includes a housing to seal the circuitry and sensing components from water, dirt and other elements. The monitoring unit 211 preferably includes communications equipment which may be the same as the communications provided for the sensor 110 shown and described herein, for allowing the sensor unit 211 to communicate the information (e.g., temperature, acceleration, acoustics, vibrations, movements, and other sensed conditions) to a gateway or other device (e.g., smartphone). The clamp monitoring device 210 may report the monitoring information through a gateway, such as for example, the gateway 160, or other gateway, and may share a gateway with one or more other monitoring sensors, such as those 110, 110a, 110b, 110c, shown and described herein.

The clamp 210 may be integrated with the communications systems shown and described herein, including gateways and other communications systems, such as networks. The system clamp monitoring device 210 may detect rail movement as well as rail temperature and vehicle detection.

The clamp monitoring device 210 may be customized for different rails and monitoring purposes. The clamp monitoring device 210 enables a temporary install, and can be implemented to perform evaluations as needed, or in locations where a condition is desired to be monitored.

In addition, after a replacement or installation of a rail or track section, the monitoring devices shown and described herein may be used to determine whether the track or rail is stable.

According to some alternate embodiments, a monitoring unit may be provided with radar circuitry and asset monitoring capabilities. For example the monitoring unit may use the radar to determine and monitor distances between the rail and a fixed target, and also may measure and monitor the temperature of the rail surface. The reporting may provide date for this information as a function of the time. For example, the combined monitoring devices may be configured as the unit 110 or the clamp device 210 shown and described herein.

The differential between two adjacently positioned spaced apart monitoring devices mounted on a rail may be used to provide a measurement and monitoring of longitudinal movement. The clamp configured device 210 shown in FIG. 7, may be used in adjacent relationship to measure longitudinal movement of the rail. According to some embodiments, each clamp monitor device 210 may have an associated Target or reference, such as a stake. The monitoring unit 211 is fixed to the rail with the clamping mechanism.

According to some alternate embodiments, the monitoring unit 110 may be configured to include a temperature sensor, an accelerometer, or both, in addition to the radar sensor. Some embodiments of the monitoring unit 110 may include circuitry and/or components to measure other properties or conditions (e.g., temperature, acceleration, acoustics, vibrations, movements, and other sensed conditions). For example, the monitoring unit 110 may be used to measure track temperature and vibration to sense whether a train is present on the track. The monitoring unit 110 may be provided with a metal backing, plug, or adapter plate on the back of the monitoring unit to provide sufficient heat transfer from the rail. For example, sensing of vibration may be used to enable distance measurements to be taken more frequently while a train is present (from 0.1 Hz up to 1 kHz for example). 3-axis vibration measurements may be determined using the monitoring unit vibration sensor. The 3-axis vibration measurements may be combined with the lateral movement of the track (measured by the radar) and the track temperature to train machine learning models to identify operating anomalies and predict track maintenance needs.

Figure 8:
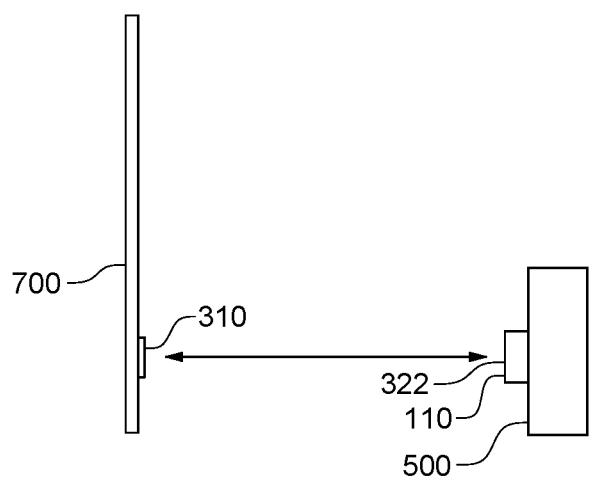
FIG. 8 is a schematic illustration of an alignment tool for aligning a target, such as a reference stake, relative to the monitoring device.

Referring to FIG. 8, a reference stake alignment tool 310 is shown in a schematic depiction which is removably mounted to the target T. The target T is shown in FIG. 8 comprising a stake 700. The stake 700 may be an angled structure that has a first wall and a second wall joined together at a right angle. The alignment tool 310 is shown mountable on the target T. For purposes of the illustration in FIG. 8, the monitoring unit 110 is shown mounted on a web of a rail 500. The side of the stake 700 preferably is aligned to be in the direct path of the radar sensor, as represented by the double arrow. A reflective target 322 may be provided on the monitoring unit 110. The stake 700 provides a reference for the monitoring unit 110 and the movement determinations.

Figure 10:
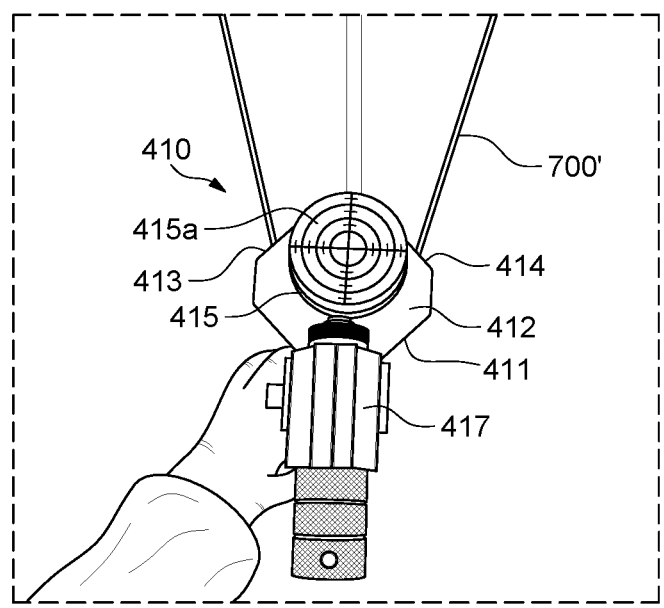
FIG. 10 is a top view of the stake alignment tool of FIG. 9.
Figure 11:
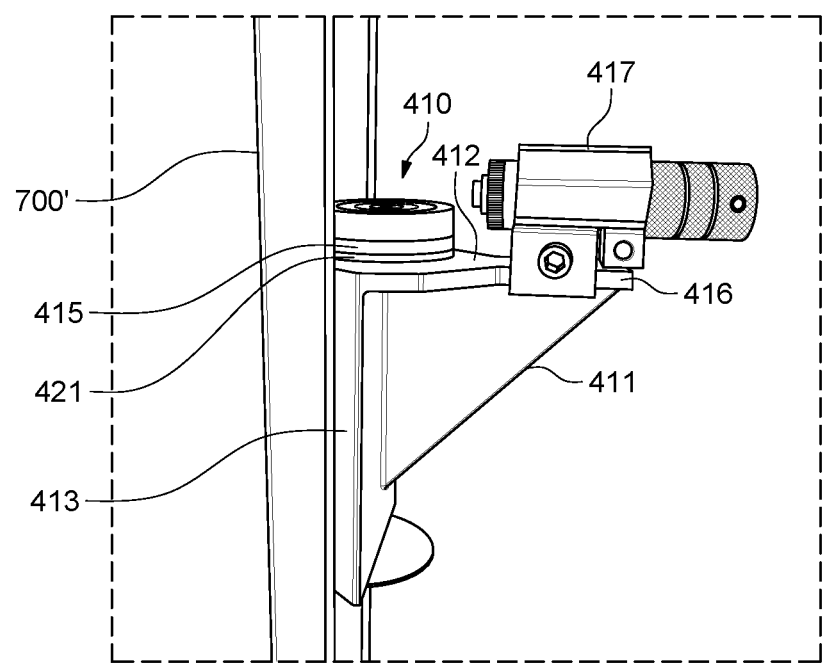
FIG. 11 is a left side view of the stake alignment tool of FIG. 9.

As depicted in FIGS. 9-11, an embodiment of stake alignment tool 410 is shown mounted on a stake 700'. The stake alignment tool 410 is similar to the alignment tool 310 represented in FIG. 8, and may be removably attached to and removed from the stake 700', as well as moved along the stake 700' (e.g., vertically raised or lowered) to perform alignment of the stake 700' to monitoring unit 110. The stake alignment tool 410 is shown having a base 411 which has a supporting shelf 412 thereon, and which has outer walls 413, 414 (see FIG. 10) having the profile of the target structure T, here the walls 413, 414 form a right angle corresponding to the configuration of the stake 700' (the target), to which the alignment tool 410 is removably mounted during the installation of the target T (e.g., the stake 700'). The alignment tool 410 is shown removably mounted on the stake 700' which serves as a target (like the target T). Suitable attachment means for removably attaching the alignment tool 410 may be used to secure the tool 410 during measurement, and allow removal of the tool 410 after the stake 700' has been aligned relative to a monitoring unit 110 (without disruption of the alignment position). For example, where the target is a stake, a suitable attachment means may comprise one or more magnets provided on the base 411, and preferably, along the walls 413, 414 that form the right angle profile. Magnets preferably have suitable strength to hold the alignment tool 410 onto the stake 700', and may be neodymium or other suitable material. A level 415 is shown mounted on the shelf 412 of the base 411. The level 415 may be mounted on the shelf 412 using an adhesive or other suitable mounting component. According to a preferred embodiment, the level 415 includes an attachment base 421 that is connected to the surface of the shelf 412 (using double-sided adhesive tape, adhesive, or other attachment product). Preferably, the level 415 includes a target, lines or other indicia 415a to facilitate alignment, and more preferably, the target, lines or indicia are positioned to provide a guide for installation and alignment. According to a preferred embodiment, the level 415 comprises an x-y bubble gauge that is used to align the stake 700' to a vertical position, so that the stake is not leaning left or right or forward or rearward. A laser 417 is shown which emits a beam from a laser diode of the laser. The base 411 of the alignment tool 410 is shown including a mounting arm 416 which supports the laser 417, and which may be formed as an extension of the shelf 412. The mounting arm 416 may be configured as a picatinny rail. The laser 417 may be clamped onto the base 411, such as on the arm 416, with a suitable mounting element, such as the clamp 418 or other fastener. As discussed in connection with the alignment tool 310, the laser alignment may be coordinated with the monitoring unit 110 (e.g., a monitoring unit 110 mounted on a rail or other location), for example, by providing a laser target on the face of the unit 110, and/or for example, by providing a reflective surface or cover 322 on the face of the unit 110. For example, in order to ensure the positioning of the target T, such as the stake 700', is in the proper position, the alignment tool 410 may be used by operating the laser 417 to deliver an output of a beam, and moving the alignment tool 410 along the stake (vertically upward or downward) until the laser beam is at the level where the monitoring unit 110 is mounted (or a mounting location of the sensor unit). The beam may be used to align the stake position with the monitoring unit 110. Preferably, the alignment is carried out by having the beam hit the sensor unit (preferably the central or target area of the monitoring unit 110, or location on the unit that will provide a suitable path to the target). The laser alignment tool 410 (and as represented by 310 in FIG. 8) may be used to align multiple stakes at desired locations to serve as references for a plurality of respective monitoring units 110 (see e.g., the references in FIG. 5). Although the alignment tool 410 is removably mounted, according to some alternate embodiments, a stake may be configured with a mounting mechanism provided as part of the stake, with a level and a diode or laser for facilitating the positioning of the stake relative to the monitoring unit 110.

The position sensor 110, 210 needs to use a reference point with a good reflective signature when calculating a position change. If the reflected signal is too weak, the signal to noise ratio means that an accurate and repeatable position measurement is not possible. According to some embodiments, an example of a reference point may typically be a 2 inch angle iron hammered into the ground. Aligning it to reflect as much signal back to the position sensor as possible can be tricky in the field. According to some embodiments, in order to facilitate the installation and alignment of the reference target T, such as a stake 700, the reference stake alignment tool 310 may be used by temporarily attaching it to the angle iron target T using magnets to align it with the position sensor. The installation of the monitoring system and devices may be deployed as follows. A reference point is identified. The position sensor 110, 210 according to some embodiments, is used with a fixed reference point added as part of the installation. According to another embodiment, an analytical approach using machine learning is implemented, that scans, analyzes and classifies the environment that the sensor 110, 210 is exposed to, and looks for suitable reference points. Upon the scan detecting and determining a suitable reference point, the reference point is used. An option for a user setting up the system may be to implement the scan, and/or to select or assign a reference point.

The present system may be monitored for its integrity to ensure that it is in a suitable operating condition. For example, according to some preferred embodiments, the signal to noise ratio may be used to make determinations of the monitoring conditions and equipment, including positions or changes thereto, and effects on operations of the monitoring being carried out. The signal will provide information corresponding to the distance condition being monitored. However, the signal needs to be discernable from any noise (i.e., background signal contributions), and preferably, the power of the signal that is being monitored to provide the distance signal of interest (the radar signal) must be greater than any background signal (that the device also may pick up). When the signal is not pronounced in strength over the background signal, then this background noise can affect the measurement determination. The presence and level of background noise, or decrease in the signal strength of the monitored signal, can be used to identify a change in a condition. The ratio between the desired information or the power of a signal and the undesired signal or the power of the background noise is the signal to noise ratio. According to some implementations, the signal to noise ratio may be used to determine whether a reference stake has moved (e.g., if it has been struck and displaced by something, for example, an animal, moving object, or truck), whether ballast is blocking the field of view between the sensor and the reference stake or other target; or whether there is a change in the sensor orientation relative to the reference stake (for example, if the sensor has been dislodged from its mounting or position on the rail in whole or part, or its orientation is no longer facing the target).

As shown in FIG. 12, a monitoring unit 110 is mounted to a rail 500" and is shown attached to the face of the rail web 502". In an alternate embodiment (see FIG. 18) the monitoring unit 110 is shown mounted to a rail using an adapter 520. According to some preferred embodiments, the monitoring unit mounting wall or mounting plate may be curved sympathetically to match or approximate the generalized curve of the rail web (e.g., which typically vary). According to some preferred embodiments, the curvature of the mounting wall or mounting plate preferably is convexly curved to facilitate mating to a concave shape of a rail web. According to some other embodiments, the monitoring unit may be provided with a curved rear surface which substantially matches the profile of the rail web face.

In the embodiment depicted in FIGS. 12-16, the monitoring unit 110 is shown with a mounting plate 150 that is used to attach the monitoring unit 110 to a rail. The mounting plate 150 has a curved surface 150a. The mounting plate 150 is shown attached to the rear of the monitoring unit 110 so that the curved side 150a is outward for mounting against the surface of the rail web. FIGS. 14, 15 and 16 best show the curvature profile of the mounting plate curved mounting surface 150a, which is mounted to the face of the rail web. The mounting plate 150 preferably includes bores therein, such as those 150b, 150c, that receive screws (similar to the screws 113, 114 shown and described in connection with the monitoring unit) to secure the mounting plate 150 to the monitoring unit 110. Preferably, the mounting plate bores 150b, 150c align to correspond with the threaded bores 115, 116 (which although shown on the front of the monitoring unit in FIG. 1, may extend through the monitoring unit 110 so that the mounting plate 150 may be secured to the monitoring unit 110 using screws). Alternatively, a second set of threaded bores may be provided in the monitoring unit 110 for attachment of the mounting plate 150. For example, FIG. 17 shows threaded bores 117, 118 provided on the back surface of the monitoring unit 110. Alternatively, other suitable mounting means for mounting the mounting plate 150 to the monitoring unit 110 may be employed. The mounting plate 150 preferably is secured to the rail web face 502" and secures the monitoring unit 110 in position. The threaded bores may comprise threaded bushings or other members provided within the monitoring unit housing that are threaded to receive matingly threaded bolts or screws to connect with a mounting plate or adapter.

According to a preferred embodiment an adhesive is used to secure the mounting plate 150 to the rail web 502". Preferably an ultra-high bond adhesive, which may be in the form of an adhesive tape, may be applied to secure the mounting plate 150 to the rail. According to some In the embodiment illustrated, mounting of the wireless monitoring unit 110 may be accomplished using double-sided adhesive tape 510, such as VHB adhesive tape (very-high bond tape), which is placed on the back surface of the mounting plate 150, which secures the mounting plate 150 and monitoring unit 110 secured thereto to the rail web 502". The mounting may be carried out by preparing the rail surface on which the monitoring unit 110 and mounting plate are to be mounted (such as the rail web face), which may require removal of dirt and exposure of a surface area for suitable adhesion to take effect. In accordance with a preferred embodiment, the mounting plate 150 includes magnetic means, and preferably, has a magnet that is suitably strong for attachment to the rail web 502". The magnet preferably also is used in conjunction with the VHB adhesive, such as a tape that is also provided on the curved mounting face 150a of the mounting plate 150. The application of the adhesive (such as the VHB tape), often requires a cure period to set up its bond strength. The magnet of the mounting plate 150 provides a clamping force that clamps the unit 110 and attached plate 150 via the magnetic force to the web, clamping the adhesive to the web 502". The monitoring unit 110 and mounting plate secured thereto are therefore mounted in position by both a magnetic force and an adhesive bond (via a VHB adhesive).

According some alternate embodiments, the mounting of the wireless monitoring unit 110 may be accomplished using double-sided adhesive tape 510, such as VHB adhesive tape (very-high bond tape), which is placed on the back of the monitoring unit 110, and secures the sensor back face to the rail web 502". Although according to preferred embodiments, the mounting plate 150 is used to secure the monitoring unit 110 to a rail, alternatively, a magnet and/or VHB adhesive, including tape, may be used to mount the monitoring unit via its rear face. According to some embodiments the monitoring unit 110 may be provided having an adhesive tape or surface with a release paper backing, so that the monitoring unit 110 is ready to install to a rail surface (e.g., rail web) or other structure (e.g., mounting bracket) upon removal of the release paper. Although double-sided tape is referred to in accordance with some embodiments, alternatively, other components may be used to secure the sensor to the rail (screws, clamps, brackets).

Figure 18:
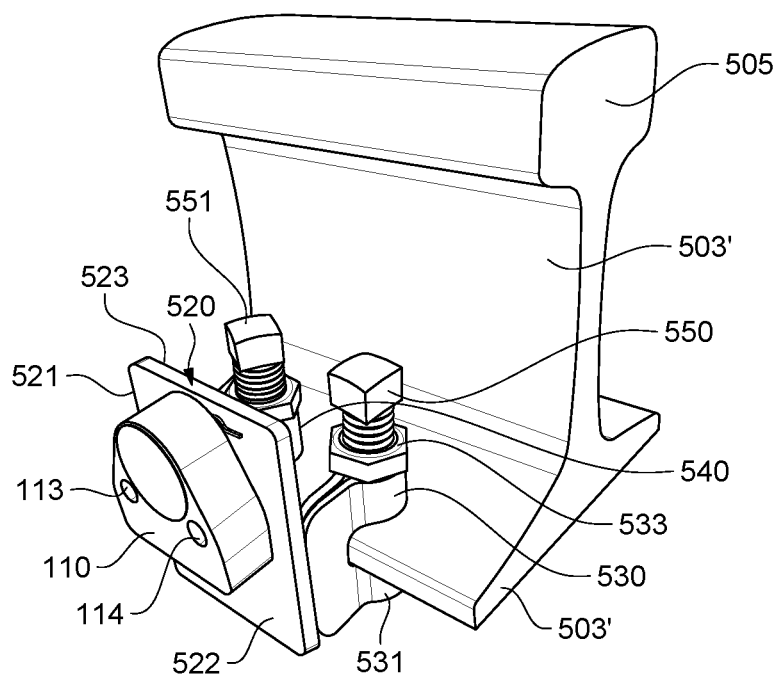
FIG. 18 is a perspective view of a section of rail showing a wireless monitoring sensor mounted to the rail section with an adapter.

According to some alternate embodiments, monitoring unit installation to a rail may be effected using an adapter or adapter plate. FIG. 18 illustrates an exemplary embodiment of an adapter 520 that is shown having a body 521, with a first face 522 and second face 523, and a pair of clamping arms 530, 531, each clamping arm 530, 531 being connected to the adapter body 521 and being spaced apart from each other to receive the rail base or foot 503' of the rail 505 therebetween. The adapter 520 is configured to hold the sensor 110 thereon and the adapter 520 securely mounts to the rail 505. The upper arm 530 is shown having a threaded bore 533 therein which receives a bolt 550. The bolt 550 is tightened to produce a clamping force to clamp the arms 530, 531 to the rail base or foot 503'. According to preferred embodiments, the bolt 550 preferably is a counterbore cup type bolt having a concave recess at the end with an edge, which preferably is a sharp edge, that bites into the top of the rail base or foot 503'. For example, the bolt 550 may have a plain cup or knurled cup edge for facilitating holding the adapter 520 onto the rail base 503'. Similarly, the second pair of clamping arms (only the upper clamping arm 540 being visible in the view shown) are connected to the adapter body 521 and clamp the adapter 520 to the rail foot 503' in a similar fashion to the clamping arms 530, 531. A bolt 551 (similar to the bolt 550) is torqued to apply a clamping force to clamp the second pair of arms to the rail base 503'. The monitoring unit 110 is shown mounted on the front face 522 of the adapter 520. The adapter 520 is mountable at a desired location on the rail, and carries the monitoring unit 110. The monitoring unit 110 may mount to the adapter 520 using any of the methods described herein, including bolts, adhesive or combinations thereof. For example, according to a preferred embodiment, the monitoring unit 110 includes mounting apertures 113, 114 and mounts to the adapter 520 using screws or bolts that thread into matingly threaded bores provided in the adapter plate front face 522. Alternatively, a magnetic mounting mechanism may be used to mount the monitoring unit 110 to the adapter plate 520, or adhesive, or a combination thereof. According to some embodiments, the adapter plate 520 is provided having a strong magnet (neodymium or other strong magnet), and more preferably, the magnet may be integrated into the adapter plate 520 to form the plate body 521. Alternatively, the monitoring unit 110 may be provided with a magnet or magnetic surface that attaches to the metal surface of the adapter plate front face 522. According to the magnetic mounting embodiments, a magnet may be used to mount the monitoring unit 110 to the adapter face 522, so that the magnet is on one of the face 522 or on the monitoring unit 110, and the other includes a surface that is attracted to the magnet. According to some embodiments, the monitoring unit 110 is mounted to the adapter face 522 using adhesive. The adhesive may be in the form of a tape (e.g., double-sided VHB tape), and may also be used in conjunction with a magnet.

The system and method also may be used to monitor rail movement relative to a platform. For example, the sensor may be installed at a location, which may be on the rail (or according to some alternate embodiments on a platform), for monitoring whether the rail has become closer to the platform. This information is valuable to monitor and ascertain, since rail movement proximal to a platform increases the risk of someone being hit by a passing train, such as for example, a passing freight train. If a movement of the rail is detected, the condition can be addressed further by sending field personnel out, or where the movement is substantial, such as an indication of a failure or greater movement, the sensor reporting may be used to stop further rail traffic or to prevent workers, other personnel, or passengers from accessing a platform (or platform area) until a safety check can be performed.

Figure 19:
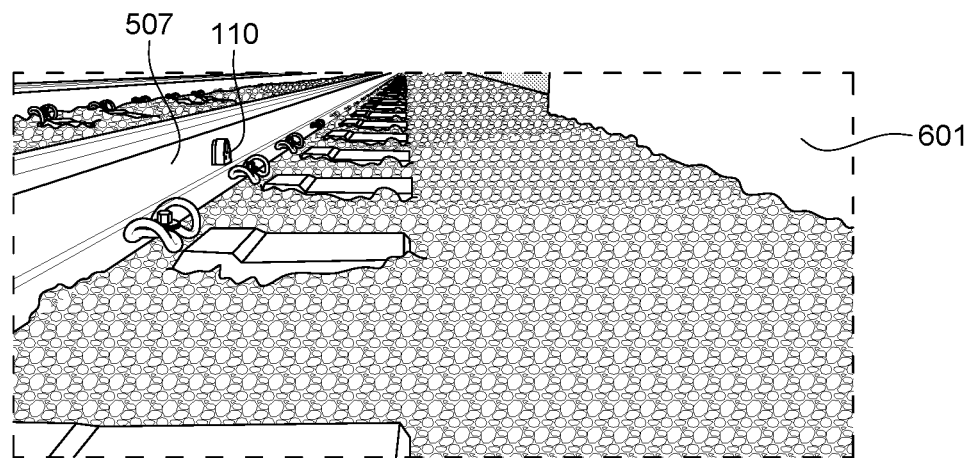
FIG. 19 is a perspective view of a rail and railbed shown in an environment with a platform shown to the right of the rail, and with a wireless monitoring sensor mounted on the rail.

FIG. 19 illustrates an exemplary depiction of a monitoring unit 110 shown mounted on a rail 507 with the sensor face pointing to a platform 601. The monitoring unit 110 may be configured similar to the sensors shown and described herein and may be mounted to the rail 507 in accordance with any of the mounting methods and components described herein. The monitoring unit 110 may be configured to provide continuous monitoring and report signals that relate to the platform-rail distance, as well as any changes that take place over time. For example, the monitoring unit 110 may be configured to take readings over a time interval that is suitable for monitoring, which may be in minutes or hours, or seconds. The monitoring may take place as shown and described herein, which may be through a gateway, or directly to another monitoring device, such as another monitoring unit. Alerts may be configured so that if a threshold is met, such as for example, a minimum distance, or a maximum change in distance readings (e.g., from one reading to the next, or other period of time or measurement points), an appropriate person is notified, a warning is issued, or an action is taken. For example, in a severe case where some force or event has caused a rail to move dangerously close to a platform being monitored, the alert may be communicated to or coordinated with an event operation, so that for example, an approaching train or rail vehicle is notified, or automatically controlled to slow down or stop before reaching the platform area. Typically, however, the rail movement may be small and gradual, and the system monitoring may determine that there is movement, and allows the condition to be addressed or remediated before any danger occurs. Alternatively, the wireless monitoring device, such as the monitoring unit 110, 210 may communicate signals to the gateway, or directly to another device or component. According to some other embodiments, railroad personnel, including those at a station or yard, or those on board the train or vehicle may have a device that receives the signals and/or alerts from the wireless monitoring devices. These may be smartphones with an application, or may be other specially configured devices. According to some embodiments, one or more smartphones may be configured as a gateway through which signals may be received from and/or communicated to a sensor, or exchanged between the smartphone and sensor, or another gateway (including from other sensors).

The systems methods and devices also may be implemented in manual switch applications. The monitoring devices may be utilized in conjunction with track switches that reroute the train in another direction. The implementation locates a position monitoring device to generate a radar signal and report the signal to indicate how a switch is set. A manual switch points may be configured with the sensor. Embodiments include manual switches that are supplied or constructed with the position monitoring sensors, or existing manual switches that may be fitted with the position monitoring system. The position monitoring system determines how the switch is set and, preferably, also communicates this to the railroad's information systems. According to preferred implementations, the position sensor is placed on the moveable portion of the switch and uses the rail that does not move as a reference or target. The system also includes reporting so that the railroad's information system may obtain the switch positions in real-time. Embodiments also may provide the railroad's information about the status of all switches to be centrally maintained to ensure the switches have been correctly set after a switching operation. Manual switches are currently only locally flagged with a mechanical marker and no record of switch movements is maintained. The system and sensor may also provide a local communication to a smartphone app to provide feedback on the status to local railroad operators. The sensors may be configured with communications circuitry as discussed herein, and may report to a remote device, through a suitable communications protocol. This may be done through a local gateway, or other intermediary, or direct in some instances.

Figure 20:
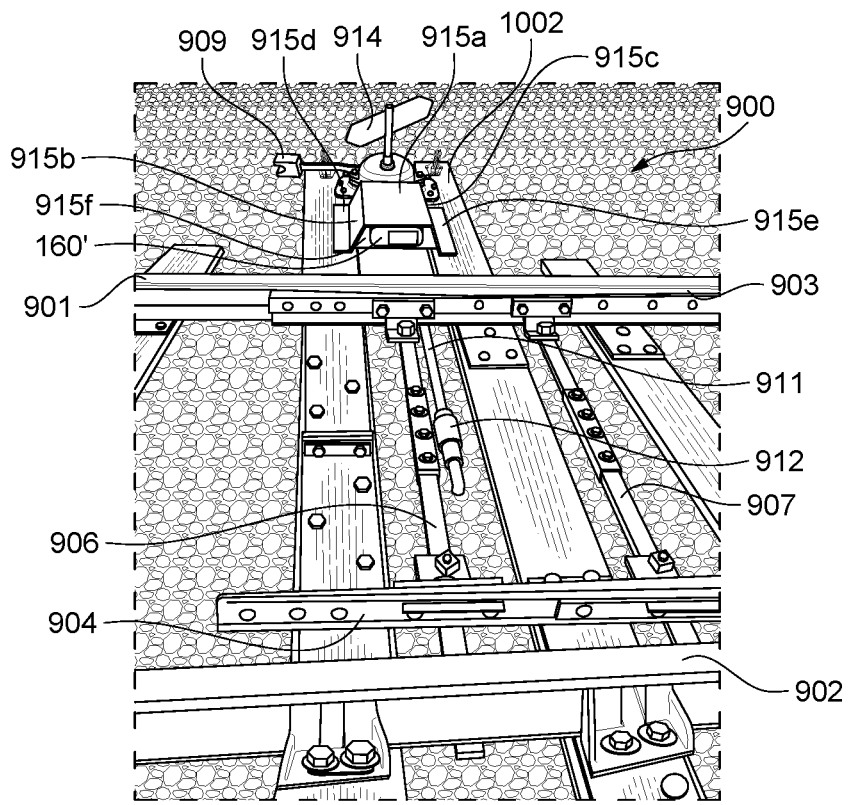
FIG. 20 is a perspective view looking from the top of a switch track portion of a rail section, showing a gateway device and housing cover installed with a wireless monitoring device (not shown) to track the movements and position of a track switch.
Figure 21:
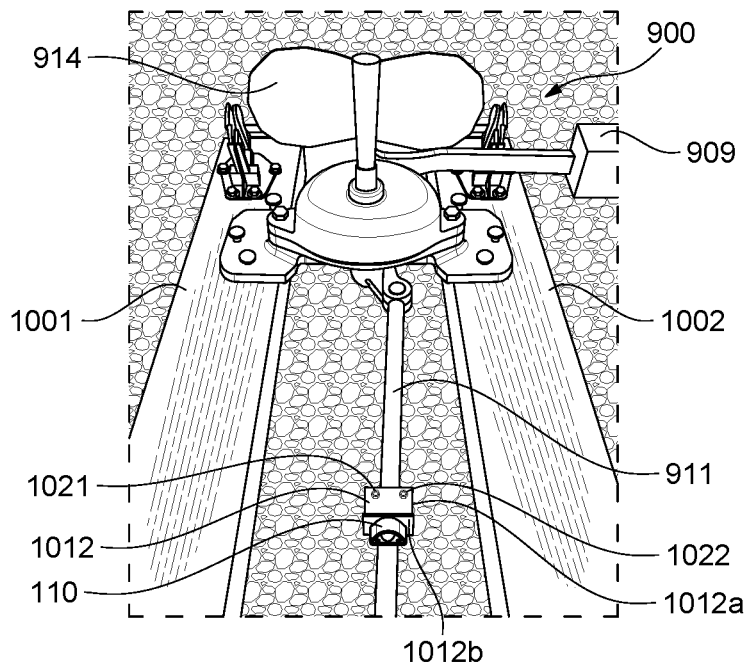
FIG. 21 is a perspective view of the switch track portion of FIG. 20, showing an enlarged partial view with the housing cover removed to expose the wireless monitoring sensor, which is shown installed on an actuating arm of switch assembly.

According to an exemplary embodiment, a first arrangement of a switch 900 is depicted in FIGS. 20 and 21. The section of track shows two main or stock rails 901, 902 and a pair of switch rails or blades 903, 904. The stock rails 901, 902 ultimately diverge after the switch 900 (to the right of the page, not shown) and typically form alternate track paths, including for example, a first track path and a second track path. The stock rails 901, 902 typically will continue and diverge to form the outer rail of each of the respective first track path and second track path. Switching of the switch rails or blades 903, 904 directs the train or railway vehicle to one track path or the other. The switch rails 903, 904 may be connected by one or more rods or cross-linkages. Referring to FIG. 20, the switch rails 903, 904 are shown connected by a cross-linkages or rods 906, 907. There is a main rod 906 and a secondary rod 907. The switch 900 includes a throw mechanism, which may include an operating mechanism, such as a motor, hydraulic, or pneumatic operator that may be used to throw the switch to an open or closed position. The operating mechanism for a number of switches involves a manual mechanism 909. The operating mechanism 909 is connected to the main rod 906 to drive the rod 906 transversely relative to the track rails 901, 902 in order to move the blades 903, 904 to the desired position. An actuator arm 911 is shown connected to the cross-linking main rod 906 by means of a connector 912. The actuator arm 911 is moved along with the transverse movement of the switch blade rails main rod member 906 (which is transverse relative to the longitudinal direction of the track rails 901, 902). The actuator arm 911 in the embodiment illustrated is shown connected to the signal flag or indicator 914 which points in a direction to correspond with the condition of the switch position—open or closed. According to typical manual switches, the actuator arm 911 is part of the mechanism that provides the indication of the switch condition, and also may be connected to an operator, such as a mechanical lever (909) or other operator, that is used to throw the switch track (the blades 903, 904) into the desired condition. According to a preferred embodiment, the position sensor 110 is mounted to generate a beam that is used to determine the distance between the sensor 110 and a target surface. The monitored movement, for example, according to a preferred embodiment may be the movement of the actuator arm 911. The detection of the position of the actuator arm 911 can be used to make determinations of the switch position, and whether the switch 900 is in the appropriate position for an approaching or anticipated train or railway vehicle. As illustrated in FIG. 20, a gateway 160', similar to the gateway 160 shown and described herein, is positioned in connection with the components of the switch 900 and is shown mounted adjacent the switch operating mechanism (909), and is covered by a housing 915. The gateway 160' preferably receives the signals from the sensor 110 (not shown), and reports (through pushing or pulling of the information) from another communication link such as a network (internet, cellular, Wi-Fi, or other) in communication with the gateway 160. The signal flag 914 preferably provided the signals, but in addition, the wireless monitoring unit 110 monitors the position of the track, and therefore may provide the condition of the switch (open or closed) to persons and equipment that are remote from the flag location or that are unable to view the flag 914.

Referring to FIG. 21, the switch 900 is shown with the housing 915 removed to show the monitoring unit 110 which is underneath the housing 915 and protected thereby. The housing preferably includes a top 915*a*, two sides 915*b*, 915*c* which have flanged edges 915*d*, 915*e* for mounting to adjacent sleepers 1001, 1002. The housing 915 preferably includes front and rear walls 915*f*, 915*g*, which protect the housed components, such as the radar monitoring unit 110 and any mounting components from dirt and debris, and other damage. The front wall 915*f* and rear wall 915*g* provide target surfaces for the radar of monitoring unit 110. In the embodiment illustrated, the monitoring unit 110 (and radar sensor therein) is shown in FIG. 18 being directed toward the front housing wall 915*f*, and the wall 915*f* serves as a target for determining the sensor signal and ultimately the switch position.

The monitoring unit 110 is attached to the actuator arm 911 to monitor the switch movement. In the mounting configuration depicted, the monitoring unit 110 is shown having a mounting bracket portion 1012 for securing the monitoring unit 110 to the actuator arm 911 of the switch 900. The actuator arm 911 makes a connection to the main cross-linkage or rod 906 (FIG. 20) to control the throwing of the switch (i.e., the switch blades 903, 904 shown in FIG. 20). The bracket portion 1012 has a base 1012*a*, and although not shown, preferably has a clamping piece that fits under the actuator arm 911, and together with the base 1012*a*, clamps the bracket portion 1012 to the arm 911 with the screws or bolts 1021, 1022. The clamping piece may have a arcuate recess therein to match the curvature of the actuator arm 911. Alternatively, a u-bolt, or other fastener may be employed to secure the bracket portion to the switch actuator arm 911. The bracket portion 1012 is shown having an upper flange 1012*b* connected to and supported by the base 1012*a*. The monitoring unit 110 is configured to mount to the bracket portion 1012, and preferably is secured to the flange 1012*b* using a suitable mounting means, such as screws, adhesive, magnets, or combinations thereof. In the embodiment depicted, a mechanical operator 909 operates the switch 900 by moving the switch rail blades 903, 904 via the actuator arm 911 through its connection to the main cross-linkage rod member 906. A housing wall 915*f*, 915*g* serves as a target, and the monitoring unit provides a signal, which may be sent for monitoring via any of the mechanisms shown and or described herein, including such as, for example, through a gateway (e.g., 160'). The movement of the actuator arm 911 moves the monitoring unit 110 and there is therefore a change in the signal distance to the target (the housing wall 915*f* in this implementation). The signals generated by the monitoring unit 110 are monitored to determine whether the switch blades 903, 904 are thrown (and whether the switch track 900 is open or closed). In addition, the monitoring unit and configuration may also determine whether a switch has failed (e.g., decoupling of a linkage or other event), and is neither in an open or closed position, but is between positions. The housing 915 preferably is shown providing a mounting surface, such as the exterior side of the front wall 915*f*, for mounting of the gateway 160'. A protective flanged area formed from the side walls 915*b*, 915*c*, and upper wall 915*a*, protects the gateway 160'. Although the housing is depicted in an exemplary embodiment, the housing may be configured to provide additional protections to the sensor and gateway components. The housing according to some alternate embodiments may be constructed to allow passage of an actuator required to operate the switch, and may include a bottom (e.g., with weep holes) and one or more apertures in the walls to permit passage of the actuator arm (such as the arm 911) to pass through.

Figure 22A:
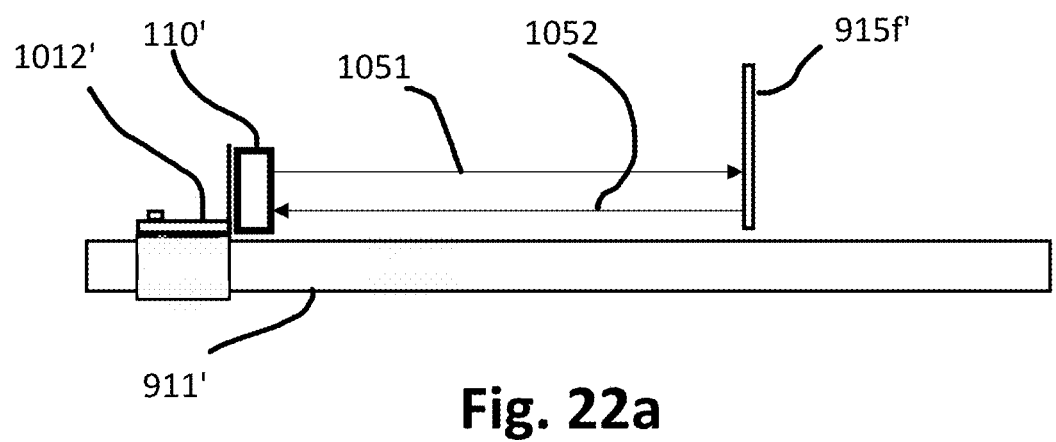
FIG. 22a is a schematic illustration of a sensing operation implementing a sensor unit in a switch track, representing a first condition of the switch.
Figure 22B:
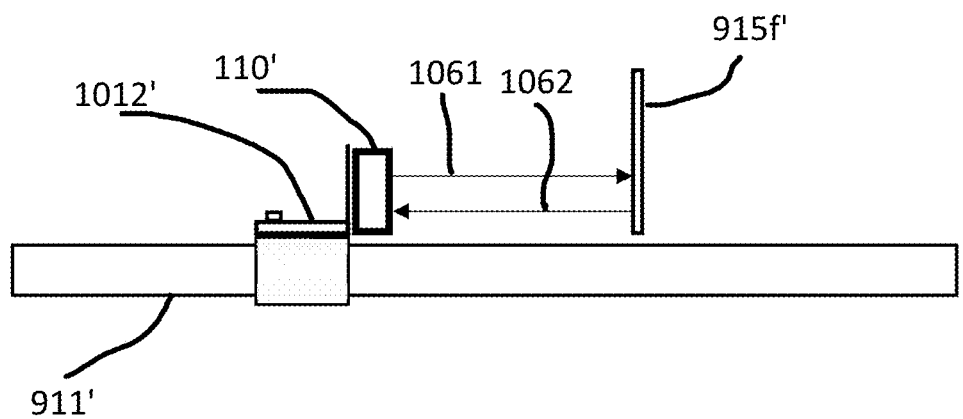
FIG. 22b is a schematic illustration of the sensing operation of FIG. 22a, representing a second condition of the switch.

FIGS. 22*a* and 22*b* are schematic illustrations representing the switch track operation to show the monitoring unit and target. In the depictions of FIGS. 22*a* and 22*b*, the representation of the housing is depicted to show a housing front wall 915*f* (such as the front wall 915*f* of FIG. 20), which is shown relative to the sensor 110', carried on the mounting bracket 1210' which is schematically represented being mounted to the actuator arm 911'. The depiction in FIG. 22*a* shows a position where the switch track blades 903, 904 are in the position shown in FIG. 20. However, when the switch, such as the switch 900 (FIGS. 20 and 21) is thrown, the sensor 110' moves with the actuator arm 911' the therefore is displaced at a different distance from the housing front wall 915*f*, as represented by the position in FIG. 22*b*. The signal distance of travel for the radar signal represented by arrows 1051, 1052 in FIG. 22*a* is shown relative to the sensor 110', where the front housing wall 915*f* serves as a target T for the monitoring unit radar. The arrows 1051, 1052 illustrate a beam direction and distance for a first condition where the actuator arm 911' and sensor 110' mounted thereon, is at a first position. In FIG. 22*b*, the actuator arm 911' has moved forward, to throw the switch, and move the blades 903, 904 to the switched position. The actuator arm 911' in FIG. 22*a* moves to the right of the page to arrive at the FIG. 22*b* position. In FIGS. 22*a* and 22*b*, the actuator arm 911' is represented schematically and represents a segment of the actuator arm, and is shown without the connections to the lever used to throw the switch, and the connection to the main rod. The sensor 110' therefore moves along with the actuator arm 911' and the signal represented by the arrows 1061, 1062 travels a shorter distance to the target, the housing front wall 915*f*. The housing front wall 915*f* does not move, and the switching operation, and position of the actuator 911' is monitored and determined based on the signals provided by the sensor 110'. The track sensing is used to confirm the position (or condition) of the switch, and provide monitoring of the switch, including remote monitoring, to make sure the switch is in the position it is expected or supposed to be in.

The monitoring units and devices 110, 210 may be configured to provide ranges and accuracy suitable for the application being monitored. For example, the sensor unit radar detection may provide monitoring of distances that are accurate to within a couple of mm (e.g., within +/−2.5 mm. In addition, the units and devices are configured to use low power communications components, and for example, may implement Bluetooth 5 with extended range, or other low power wireless mesh for reliable connectivity in harsh conditions, and may utilize near field communication (NFC) to provide wireless touch technology to pair the monitoring unit and devices with a smartphone, gateway or other device. The monitoring units and devices also may be communicate with the gateways shown, as well as other devices, including via a cellular gateway or other third party gateways. The devices and monitoring units also are constructed for operation in a variety of temperature and weather conditions, including those in which the rail or other item being monitored is located or operating.

According to the above embodiments and alternate embodiments, the system, methods and devices also are used to evaluate and monitor other track conditions. For example, embankments may be monitored to determine if the ground around the track has moved suddenly (possibly due a weather event) or slowly over time (ground slip). The position sensor may be installed on the ground that moves and uses a target, such as a reference stake, that does not move, or it is placed on a reference point and scans the field of view for distance changes. This approach may use a machine learning algorithm to interpret positions to monitor for movement. The information provided may be used to initiate an inspection or send an alert of possible track obstruction or loss of structure around the track necessary to support the load of a train. According to some embodiments, the system may communicate a signal to an on board train operating system to cause the train to stop before reaching the hazardous track condition.

The devices, system and methods may be used to monitor bridges. For example, some bridges may be hit by road or marine vehicles potentially moving the bridge structure and misaligning the track. While an accelerometer can identify whether an impact has occurred, the ability to report subsequence misalignment is more important to determine the severity of the damage and the action required. According to some implementations, the sensor may be fixed to one part of the bridge using another part as a reference.

The system, method and devices may be utilized to determine the condition of a tunnel through which railway vehicles pass. Tunnels may become deformed over time with side walls moving towards the track and potentially causing contact with a train. A position sensor may be mounted on any area of concern and determine the distance between the side wall and a train.

In addition, the system, method and devices may be utilized in conjunction with monitoring platforms. The position sensor may be mounted to the track, and the platform structure as a reference can determine if the track has moved too close to the platform—possibly resulting in someone on the platform, standing close to the edge, being hit by a passing train. The movement of the track could be caused by track buckling for instance.

The system may be configured to have the monitoring devices communicate the information, and also processing and generating a signal to a train in real-time where a train is or would otherwise be on a path to travel over the location where the condition has been indicated. According to other embodiments, the train may be slowed down through a communication transmitted to the train control system (through a cellular communication network, or other communication mechanism).

The monitoring sensors shown and described herein may be configured and tested using a smartphone, and interfaces may be provided so that a smartphone using a suitable communication protocol to exchange information with the monitoring sensor. The smartphone app may be used to configure the monitoring device and to optimize/test installation.

The system also may provide standardized reporting of the rail health.

The system also may be configured to implement machine learning to automate anomaly identification and to predict movement over temperature.

What is claimed is:

1. A rail monitoring method for monitoring a condition of a rail of a railway track comprising:
    a) installing a monitoring sensor on a rail at a location of the rail to be monitored;
    b) capturing with said monitoring sensor rail data comprising movements of the rail being monitored;
    c) determining from captured movements a condition of the rail being monitored;
    d) wherein said sensor comprises a radar unit, and wherein installing said sensor on said rail includes directing the aim of said radar unit to a fixed structure relative to said rail; and
    e) wherein said radar unit is positioned on a rail having a rail face opposing a platform or portion thereof, wherein said radar unit has a detection range to detect the platform, wherein said platform is located within the detection range of said radar unit, wherein capturing with said monitoring sensor rail data comprising movements of the rail being monitored comprises movements of the rail relative to the platform, and wherein determining from captured movements a condition of the rail being monitored includes the distance between the rail and the platform, the method further including providing a threshold distance for a safe operation distance between said rail and said platform, and wherein when the condition does not meet or exceeds the threshold safety distance, communicating an alert.

2. The method of claim 1, wherein the sensor includes an accelerometer and the method includes detecting vibrations and determining whether a rail vehicle is on the track or passing along the track.

3. The method of claim 1, wherein the rail being monitored includes a side surface, and wherein the aim of said radar unit is directed to the fixed structure relative to the side surface of the rail.

4. The method of claim 1, wherein said monitoring sensor includes circuitry programmable to record rail data at periodic intervals.

5. The method of claim 4, wherein said monitoring sensor includes communication means for communicating rail data from said monitoring sensor to a remote component by broadcasting a communications signal.

6. The method of claim 1, wherein said condition of said rail is communicated to an on board system of a railway vehicle or train traveling on or approaching the rail being monitored, and wherein when the condition is an unsafe condition, stopping further progress of the railway vehicle or train.

7. The method of claim 1, wherein two monitoring sensors comprising radar sensors are adjacently spaced along a rail to monitor the longitudinal movement of the rail.

8. The method of claim 1, wherein the platform or portion thereof comprises the fixed structure.

9. The method of claim 1, wherein installing the monitoring sensor on the rail at the location of the rail to be monitored includes clamping the sensor element to the rail.

10. The method of claim 1, wherein installing the monitoring sensor on the rail at the location of the rail to be monitored includes magnetically attaching the sensor to the rail at the location of the rail to be monitored.

11. The method of claim 1, wherein installing the monitoring sensor on the rail at the location of the rail to be monitored includes installing a mounting plate onto the rail, and attaching the monitoring sensor unit to the mounting plate.

12. A rail monitoring method for monitoring a condition of a rail of a railway track comprising:
    a) installing a monitoring sensor on a rail at a location of the rail to be monitored;
    b) capturing with said monitoring sensor rail data comprising movements of the rail being monitored;
    c) determining from captured movements a condition of the rail being monitored;
    d) wherein said sensor comprises a radar unit, and wherein installing said sensor on said rail includes directing the aim of said radar unit to a fixed structure relative to said rail; and
    e) wherein the sensor radar unit is configured to generate signals for detection, and wherein said signals are directed to a target, and wherein monitoring includes monitoring the strength of the signal and determining a signal to noise ratio; ascertaining from said signal to noise ratio whether a condition has occurred that affects the measurement of movements of the rail being monitored.

13. The method of claim 12, wherein said signal to noise ratio determination identifies one or more of the following conditions: whether a reference stake had moved, whether the field of view between the sensor and reference stake is blocked or impeded, and whether the sensor orientation relative to the reference stake has changed.

14. The method of claim 13, wherein said reference stake comprises or carries thereon the target.

15. The method of claim 12, wherein the sensor includes an accelerometer and the method includes detecting vibrations and determining whether a rail vehicle is on the track or passing along the track.

16. The method of claim 12, wherein the rail being monitored includes a side surface, and wherein the aim of said radar unit is directed to the fixed structure relative to the side surface of the rail.

17. The method of claim 12, wherein said monitoring sensor includes circuitry programmable to record rail data at periodic intervals.

18. The method of claim 17, wherein said monitoring sensor includes communication means for communicating rail data from said monitoring sensor to a remote component by broadcasting a communications signal.

19. The method of claim 12, including installing the fixed structure proximate to said rail being monitored, wherein said radar unit has a detection range, and wherein said fixed structure is positioned within the detection range of said radar unit.

20. The method of claim 12, wherein said condition of said rail is communicated to an on board system of a railway vehicle or train traveling on or approaching the rail being monitored, and wherein when the condition is an unsafe condition, stopping further progress of the railway vehicle or train.

21. The method of claim 12, wherein two monitoring sensors comprising radar sensors are adjacently spaced along a rail to monitor the longitudinal movement of the rail.

22. The method of claim 12, wherein the fixed structure comprises the target or includes a target thereon.

23. The method of claim 12, wherein installing the monitoring sensor on the rail at the location of the rail to be monitored includes clamping the sensor element to the rail.

24. The method of claim 12, wherein installing the monitoring sensor on the rail at the location of the rail to be monitored includes magnetically attaching the sensor to the rail at the location of the rail to be monitored.

25. The method of claim 12, wherein installing the monitoring sensor on the rail at the location of the rail to be monitored includes installing a mounting plate onto the rail, and attaching the monitoring sensor unit to the mounting plate.

26. A rail monitoring system for monitoring a condition of a rail of a railway track comprising:
   a) a monitoring sensor with mounting means for mounting said monitoring sensor on a rail at a location of the rail to be monitored;
   b) circuitry in the monitoring means configured with instructions for obtaining measurements of rail movements of the rail being monitored;
   c) said monitoring sensor comprising a radar unit, the radar unit having a detection range, the radar unit being programmable to generate and direct a radar beam at a target within the detection range at periodic intervals, and wherein said monitoring sensor includes a communication component that is configured to communicate and receive signals between a remote device;
   d) a processor associated with a remote device that receives monitoring signals from the monitoring unit;
   e) the processor configured to determine from said monitoring signals a condition of the rail being monitored;
   f) a target positionable at a fixed location, and configured having a surface onto which said radar beam from said monitoring sensor is directed, the monitoring device circuitry configured to measure the radar signals and determine from said signals the distance between said monitoring sensor and said target; and
   g) a target alignment tool being removably mounted to the target, including a level, and including a beam generator that generates a beam that is alignable to radiate onto an alignment point on the monitoring sensor, and wherein said target alignment is confirmed when said target alignment tool beam radiates onto said alignment point.

27. The system of claim 26, wherein the monitoring sensor is implemented in a switch track being controlled by an actuator that moves to throw the switch between open and closed positions, wherein said monitoring sensor is mounted on the actuator of the switch track, and wherein said monitoring sensor determines the position of the switch.

28. The system of claim 26, wherein said target comprises another monitoring sensor.

29. The system of claim 26, wherein said means for mounting comprises an adapter having a body portion with a face to which said sensor is mounted, and having a clamping element adapted to clamp onto a rail.

30. The system of claim 29, wherein said sensor is mounted to said face using one or more of screws, magnets, and adhesive.

31. The system of claim 26, wherein said mounting means comprises a mounting plate attachable to said monitoring sensor, said mounting plate including an attachment side that attaches to said monitoring sensor and a mounting side, said mounting side having a convex profile.

32. The system of claim 31, wherein said mounting plate includes a magnet, and including adhesive for adhering the mounting side of the mounting plate to a web of a rail, wherein said magnet is disposed in said mounting plate to provide a clamping force against the rail web thereby clamping the adhesive between mounting plate mounting side and the rail web.

\* \* \* \* \*